Oct. 10, 1944.  W. J. CLAYTON ET AL  2,360,201
TOP PLATE FOR MOLDS
Filed Oct. 28, 1941  3 Sheets-Sheet 1
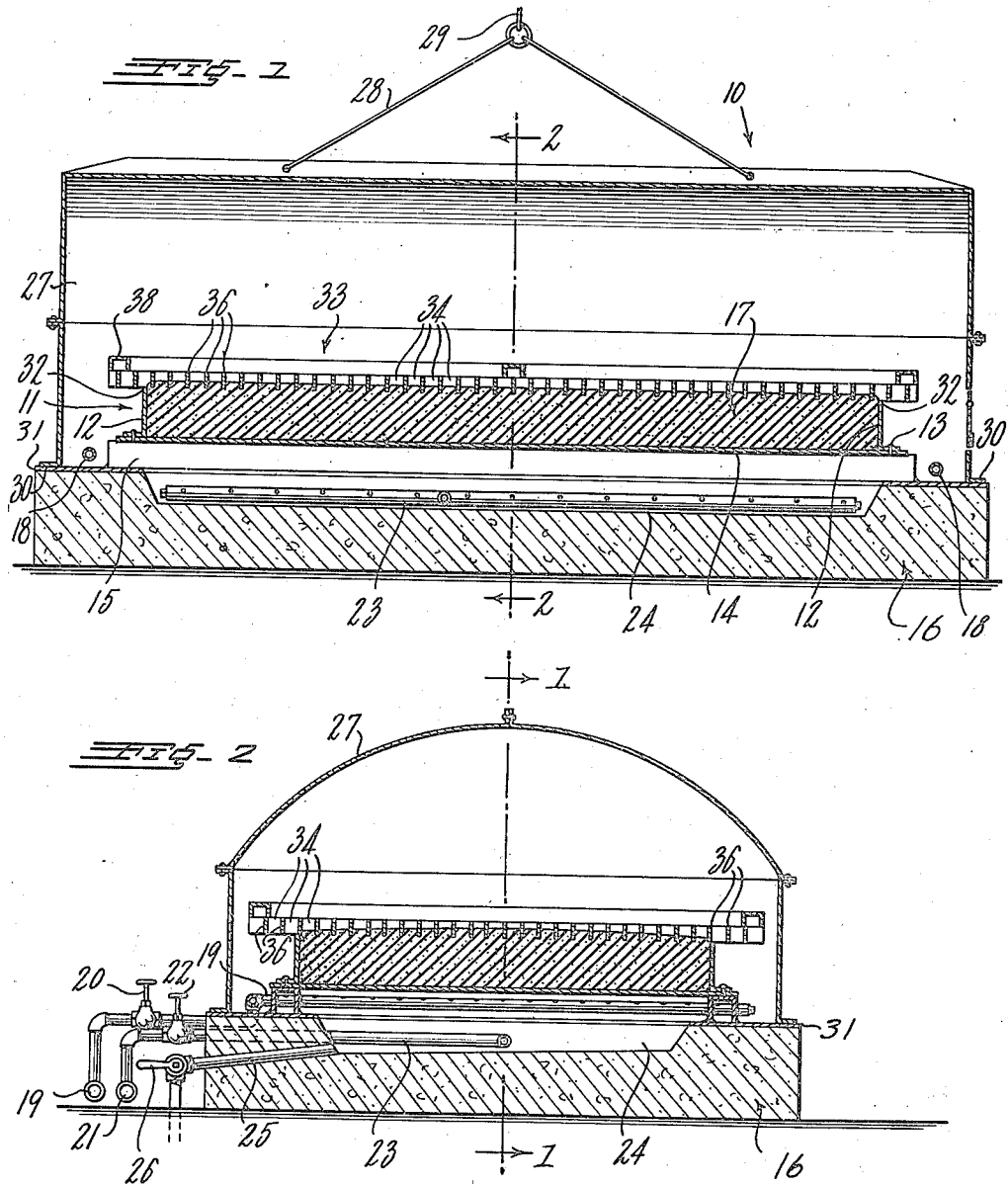
INVENTORS
WILLIAM J. CLAYTON
JOHN F. SCHOTT
BY
ATTORNEY Oct. 10, 1944.  W. J. CLAYTON ET AL  2,360,201
TOP PLATE FOR MOLDS
Filed Oct. 28, 1941  3 Sheets-Sheet 2

INVENTORS
WILLIAM J. CLAYTON
JOHN F. SCHOTT
BY Lester J. Budlong
ATTORNEY

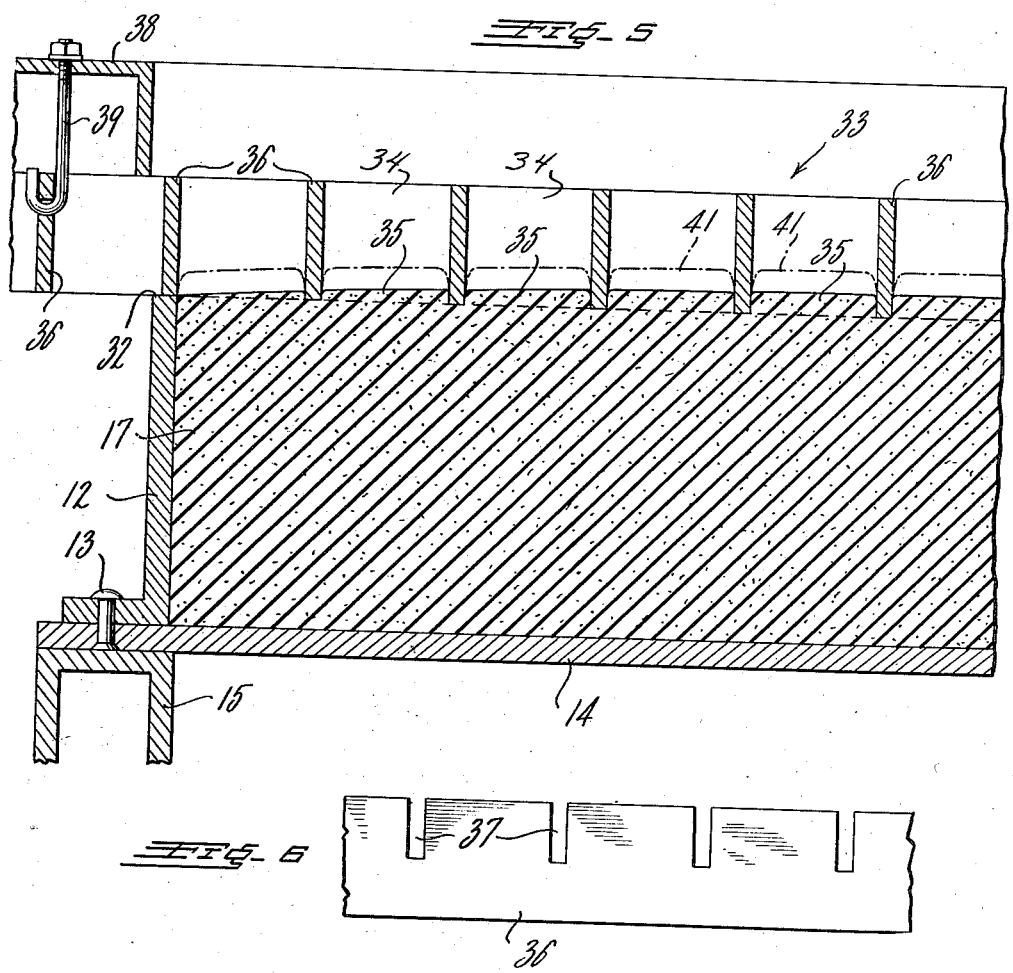
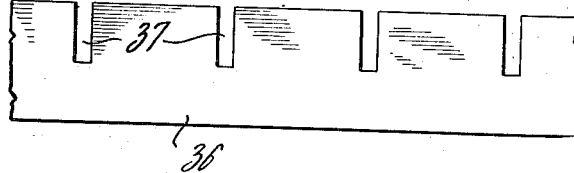

Patented Oct. 10, 1944

2,360,201

UNITED STATES PATENT OFFICE 2,360,201

TOP PLATE FOR MOLDS

William J. Clayton and John F. Schott, Mishawaka, Ind., assignors to United States Rubber Company, New York, N. Y., a corporation of New Jersey Application October 28, 1941, Serial No. 416,792

1 Claim. (Cl. 18—39)

This invention relates to the fabrication of shaped heat-treated articles, especially to the manufacture of such articles by setting foamable material into solid shapes, and is of particular use when employed in the fabrication of latex foam into vulcanized sponge rubber cushions for automobiles, or into vulcanized sponge rubber mattresses, although the invention may be utilized in any field for which it is adapted by the nature of our improvements.

For a long time it has been recognized that none of the present formulae for latex foam sponge can be used to produce in an open mold light density sponge which has a low and uniform vertical shrinkage. In order to overcome this difficulty it is well understood that some form of a top plate must be used.

Other workers in this field have found that solid plates, or plates with holes, cored plates, and wire screens, could be used as top plates for latex foam molds. Each of these types of top plates can be used to produce sponge units which are satisfactory in general, but each such form of top plate has one or more disadvantages. Some of the most important of these expedients are listed below.

A. *Solid plates.*—The bottoms of the sponge units which are produced in a mold with a solid top plate, are found to be covered with small cavities caused by entrapment of air. (In most cases sponge units are molded in inverted molds, and therefore the plate covers what is to become the bottom side of the unit.)

B. *Solid plates with holes.*—The aforesaid cavities are reduced but not eliminated by using top plates which contain a large number of vent holes.

C. *Cored plates.*—Cored plates can be used to prevent excess vertical ridges but the stock produced is a cored stock rather than a solid material. The cost of cored plates is another disadvantage in their use.

Accordingly, an object of the present invention is to provide top plates for foam sponge molds which shall be free from the disadvantages and inconveniences encountered in the use of earlier forms of top plates but will retain the proved advantages of those top plates and will have in addition many advantages in operation which will not only increase the convenience of fabrication of such foam sponge articles, but will result in an increased and more economical production of a more satisfactory product.

Ancillary to the above general object, it is an object of the invention to provide a foraminous top-plate structural element for such molds in which the openings are of suitable dimensions to permit the foam to rise into a multiplicity of the openings so that the top-plate will support the foam so engaged preparatory to vulcanization, but when vulcanized the resulting sponge rubber article and the foraminous top-plate may be neatly separated by a conventional stripping operation. The construction is preferably such that the top plate will afford maximum support for the weight of the sponge mass without causing the sponge mass to tear where the top plate is pulled loose therefrom.

Other features and objects of the present invention will appear as progress is made in the description of the accompanying drawings, illustrative of a now preferred form of structure in the making of which the present invention has been carried into effect.

In the accompanying drawings like characters of reference have been applied to similar parts throughout the various figures which make up the drawings, in which:

Fig. 1 is a view in longitudinal sectional elevation of a molding apparatus in the construction of which the present invention has been embodied;

Fig. 2 is a view taken on the line 2—2 of Fig. 1 in vertical section;

Fig. 5 is a view in vertical sectional elevation on an enlarged scale of a portion of the structure as shown at the left hand end of Fig. 1, illustrating the manner in which the latex foam under treatment reacts under application of the top plate constituting the present invention;

Fig. 6 is a fragmentary detail view in vertical sectional elevation of one of the elements of the perforated top plate illustrated in Fig. 5 and in Fig. 1; and Fig. 7 is a fragmentary detail view, taken in front elevation, of a part of a scraper used in forming a crowned surface upon the latex foam preparatory to its vulcanization in the apparatus of Fig. 1.

Figure 3:
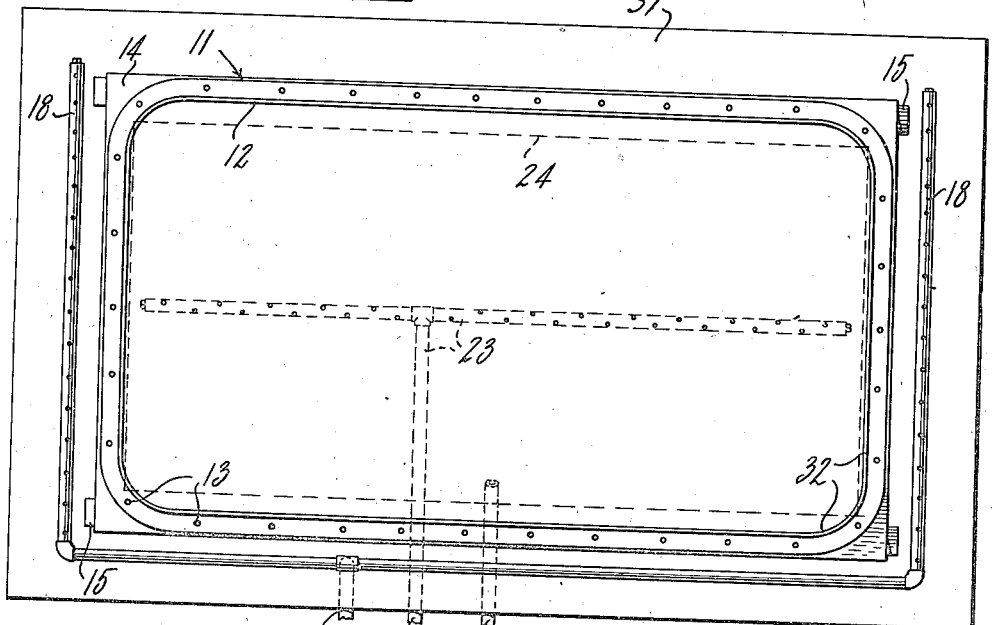
Fig. 3 is a plan view of the apparatus shown in Fig. 1 with the vulcanizing hood omitted.
Figure 4:
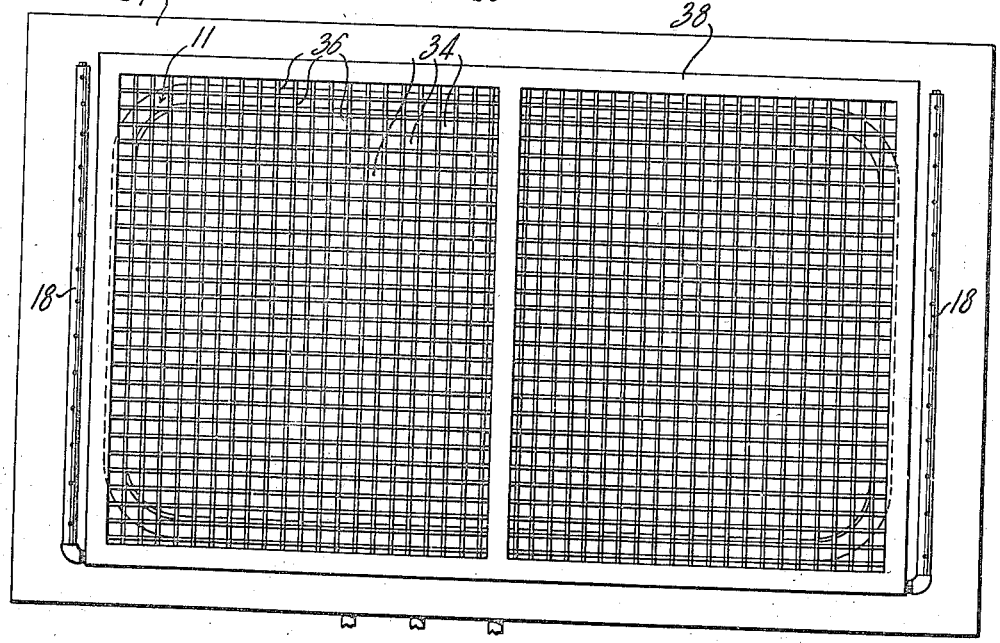
Fig. 4 is a view similar to Fig. 3, showing however the grid utilized as a top plate in accordance with the invention.

Referring now to the drawings, 10 designates generally a vulcanizing unit in which a mold frame 11 is made to receive a suitable quantity of latex foam which is the material that in this instance is to be treated. The mold frame comprises upright walls 12, bolted at 13 to a mold bottom plate 14 which is in turn supported by a metal plate 15 mounted upon a foundation 16 which may be made of concrete or cement, or other suitable material.

The foam 17 to be treated occupies the central cavity enclosed by the walls 12 and bottom 14 of the mold, and provision is made for a suitable source of heat, such as the pipes 18 leading from a steam line 19 having a control valve 20.

For the purpose of introducing water, a supply pipe 21 is illustrated, having a control valve 22 and preferably leading to a spray pipe 23 which may desirably be disposed in a recess 24 formed in the concrete base 16, this recess being adapted to serve also as a sump from which liquid may be withdrawn through a drain pipe 25, controlled by a valve 26.

An oven 27 of conventional or other suitable form and material, such as sheet metal, may be raised and lowered by the bridle 28 and cable 29, and when in use is shown as resting at 30 upon a steel plate 31 supported upon the base 16.

In pursuance of the invention, provision is made of a top plate 33, taking the form of a foraminous structural element adapted to be disposed above the foam-filled cavity 17, resting upon the upper edges 32 of the side walls 12.

This element may be of any construction adapted to afford a multiplicity of deep openings, as 34, into which the foam 17 may extend in the form of upright projections 35, (see Fig. 5) separated from each other by grooves or slots which are made by the vertical partitions 36 that define the openings 34. These openings are of uniform cross section throughout their height. This prevents clogging of the grill and facilitates stripping of the grill without tearing the molded material.

In the instance illustrated rectangular apertures 34 are constituted by the upright metal partition members 36 which are notched at 37 and interfit to form a grid, being fastened to a peripheral metal frame 38 by suitable fittings such as the hook-bolts 39 illustrated in Fig. 5.

In the operation of the mold, the space 17 is filled with foam to a height which may desirably extend approximately a quarter of an inch above the upper edges of the surrounding walls 12, and then this upper zone or stratum, as best seen in Fig. 5, receives a crowned shape, which is imparted to it by means of a suitable scraper, such as that shown at 40 in Fig. 7, the scraper being drawn over the upper edges 32 of the side walls 12 from end to end.

When the grid is lowered into contact with the upstanding foam, the latter preferably occupies substantially the position indicated by full lines in Fig. 5, and after its heat-treatment, such as vulcanization, the foam may rise to approximately the height 41 indicated by dotted lines in Fig. 5, taking the form of a multiplicity of small cushion-like elements which present somewhat the appearance of square loaves.

After vulcanization in the conventional or other suitable manner, the grid may be lifted from the contiguous surface made up of these sponge rubber subdivisions of the main surface, which are found to clear themselves neatly from the circumjacent partitions 36, leaving the latter with few accretions, which can be readily washed, brushed or scraped off preparatory to the next use of the grid.

From the foregoing disclosure, it is clear that we have provided a structural top-plate element of a foraminous character which is constructed and arranged to carry into effect the stated objects of the instant invention, particularly in the important respects that the walls of the openings 34 are adapted to support the foam, which rises to a suitable distance into the openings 34 but does not penetrate far enough to run together above the top of the plate, so that there is no tendency for the resulting sponge rubber unit to be torn when the plate is stripped; and the foraminous grate is further serviceable in the important respect that it does not clog readily, and may be easily kept clean.

Having thus described our invention, what we claim and desire to protect by Letters Patent is:

In a mold of the class intended for use in the fabrication of shaped articles from latex foam and like moldable material adapted to be set in solid form, and in combination with a bottom wall and side walls designed to confine said material, a rigid open grid adapted to cover the foam and formed of flat partition strips having their flat faces in upright position and arranged to define a multiplicity of openings having deep surrounding straight walls so disposed as to receive the upper surface of the foam and to support the same in an elevated position during the operation of setting the foam into solid form; whereby the foam can rise a substantial amount in said openings in the form of straight-sided, loaf-like projections without reaching the upper ends thereof so as to support the weight of the foam mass and permit said solid foam to be stripped in substantially intact condition from the grid.

WILLIAM J. CLAYTON.
JOHN F. SCHOTT.